United States Patent [19]

Shimotori et al.

[11] Patent Number: 5,708,731

[45] Date of Patent: Jan. 13, 1998

[54] PATTERN MATCHING METHOD WITH PIXEL VECTORS

[75] Inventors: Akira Shimotori, Hachioji; Kiyoo Kobayashi, Hannou, both of Japan

[73] Assignee: Nireco Corporation, Tokyo, Japan

[21] Appl. No.: 676,098

[22] Filed: Jul. 2, 1996

Related U.S. Application Data

[63] Continuation of Ser. No. 285,471, Aug. 3, 1994, abandoned.

[30] Foreign Application Priority Data

Aug. 9, 1993 [JP] Japan .................. 5-196553

[51] Int. Cl.$^6$ ......................................... G06K 9/56
[52] U.S. Cl. .................. 382/205; 382/194; 382/209
[58] Field of Search ....................... 382/197, 205, 382/194, 209

[56] References Cited

U.S. PATENT DOCUMENTS

| | | | |
|---|---|---|---|
| 4,630,308 | 12/1986 | Hongo | 382/205 |
| 4,700,400 | 10/1987 | Ross | 382/205 |
| 4,797,941 | 1/1989 | Lloyd et al. | 382/205 |
| 4,903,313 | 2/1990 | Tachikawa | 382/205 |
| 4,958,374 | 9/1990 | Tokita et al. | 382/149 |
| 4,977,603 | 12/1990 | Irie et al. | 382/205 |
| 5,007,098 | 4/1991 | Kumagai | 382/185 |
| 5,031,225 | 7/1991 | Tachikawa et al. | 382/185 |
| 5,182,777 | 1/1993 | Nakayama et al. | 382/170 |
| 5,214,717 | 5/1993 | Kimura et al. | 382/209 |
| 5,222,158 | 6/1993 | Takasaki et al. | 382/293 |
| 5,337,372 | 8/1994 | LeCun et al. | 382/205 |
| 5,379,350 | 1/1995 | Shimazu et al. | 382/197 |

FOREIGN PATENT DOCUMENTS

| | | |
|---|---|---|
| 0586217 | 3/1994 | European Pat. Off. ......... 382/209 |
| 59-69878 | 4/1984 | Japan . |
| 60-97482 | 5/1985 | Japan . |
| 60-103492 | 6/1985 | Japan . |
| 2100904 | 1/1983 | United Kingdom . |

OTHER PUBLICATIONS

Bhaskar et al. ("Parallel Processing of Region Boundaries", Pattern Recogntion vol. 22, No. 2, pp. 165–172, 1988.

*Primary Examiner*—Joseph Mancuso
*Assistant Examiner*—Jayanti K. Patel
*Attorney, Agent, or Firm*—Lowe, Price, LeBlanc & Becker

[57] ABSTRACT

Each of a certain number of sequences of binary pixels chosen according to some prescribed rules from m×n matrix of pixels is referred to vector $v_i$. A standard character k is represented with m×n matrix of binary pixels, from which the vectors $g_{ki}$ are derived. The reference vectors $G_{ki}$ are comprised of the vectors $g_{ki}$ and $g_{ki}$ which are generated by modification of $g_{ki}$. A recognition object is captured to yield m×n matrix of binary pixels, from which the vectors $v_i$ are derived for comparison with the reference vectors $G_{ki}$. Matching of $v_i$ with one of the reference vectors $G_{ki}$ adds a count to the standard pattern k corresponding to $G_{ki}$. The standard character k with the maximum score of the matching count is recognized as the recognition object.

21 Claims, 10 Drawing Sheets

|   | V17-1 | | | | V17-2 | | | | V17-3 | | |
|---|---|---|---|---|---|---|---|---|---|---|---|
| 1 | 1 | 1 | 0 | 0 | 1 | 1 | 0 | 0 | 0 | 1 | 1 |
| 2 | 1 | 1 | 0 | 0 | 1 | 1 | 1 | 0 | 0 | 1 | 1 |
| 3 | 1 | 1 | 0 | 1 | 1 | 1 | 0 | 0 | 0 | 1 | 1 |
| 4 | 1 | 1 | 0 | 0 | 1 | 0 | 0 | 0 | 0 | 1 | 1 |
| 5 | 1 | 1 | 0 | 0 | 0 | 1 | 0 | 0 | 0 | 1 | 1 |
| 6 | 1 | 1 | 0 | 0 | 0 | 0 | 0 | 0 | 0 | 1 | 1 |
| 7 | 1 | 1 | 0 | 1 | 1 | 1 | 1 | 0 | 0 | 1 | 1 |

FIG.8

|      | V3  | V4  | V5  |
|------|-----|-----|-----|
| V0   | $P_{00}$ | $P_{10}$ | $P_{20}$ |
| V1   | $P_{01}$ | $P_{11}$ | $P_{21}$ |
| V2   | $P_{02}$ | $P_{12}$ | $P_{22}$ |

PATTERN MATCHING METHOD WITH PIXEL VECTORS

This application is a continuation of application Ser. No. 08/285,471 filed Aug. 3, 1994, now abandoned.

BACKGROUND OF THE INVENTION

This invention relates to a pattern matching method for accurate recognition of patterns deviated to a certain extent by using a relatively small number of reference patterns. In general, for the recognition of characters and figures, two(2) methods are employed. A first is a method of feature extraction from patterns of recognition object. A second is a method of pattern matching with the reference patterns and has been widely utilized in the fields seeking high-speed recognition in general.

The pattern matching method is a most common method in which a recognition-objected character is captured to provide a pattern for recognition, which undergoes preprocesses such as shading correction, decision of character specific area, and binarization. The character pattern, normalized in size if necessary, is compared with the reference patterns (templates) similarly normalized so that the recognition-objected character is recognized as the character of the template matched. In pattern matching invariance of the recognition-objected character (hereinafter character implies both character and figure) has been assumed. This has often resulted in severe decrease of recognition accuracy due to morphological variance of the character, especially, of boldness in stroke. As a matter of fact, the degree of mismatching because of variation on boldness is significantly comparable to that in reference to wrong characters. In FIG. 10A the degree of mismatching is seen between the numerals 2 and 3, while that between the numeral 3 in the standard sample and written in a thick stroke is shown in FIG. 10B. The degree of mismatching with wrong characters becomes comparable to that between the standard sample and thick or thin stroked character, reducing the feasibility of pattern matching. In addition to variance of character in thick or thin stroke, partial fading, rotation and variation in capture conditions also cause mismatching.

A common method designed to overcome these disadvantages is preparation of references learned so as to lead to unique recognition result among every possible combination of pixels in an m×n matrix plane. This practice of pattern matching at each pixel is hardly realized because, for the size of matrix practically representable of a character, for example, 10×10, all combination of pixels would amount to an impossible number of $2^{100}$. Pattern matching with higher efficiency and less volume of data is thus in keen demand.

SUMMARY OF THE INVENTION

It is accordingly an object of this invention to provide a pattern matching method for recognition with high accuracy of characters and figures deviated to a certain extent from the standard patterns, and with feasibility in practical hardware structures. In this invention, a recognition object is captured to yield an image consisting of binary pixels arranged in a matrix of m rows by n columns, from which vectors, or pixel trains, $v_i$ are formed as sequences of pixels chosen according to prescribed rules. Of all the vectors, a certain number of vectors is selected and compared with the corresponding reference vectors of each standard sample k. To the sample p having the reference vectors matched, the matching count is added so that the pattern q with the maximum score of matching count is recognized as the sample of the recognition object.

BRIEF DESCRIPTION OF THE DRAWINGS

FIGS. 4A, 4B and 4C indicate three different vectors, respectively, chosen from the matrix for numeral 3 in FIG. 3;

FIG. 6 shows a pattern change of a vector (pixel train) according to the rules illustrated in FIG. 5;

FIG. 8 shows a 3×3 matrix to be transformed into the vectors using the transformation circuit in FIG. 7;

DESCRIPTION OF THE PREFERRED EMBODIMENT

Some preferred embodiments of the invention will be described hereinbelow with reference to the accompanying drawings. For simplicity, the various pixel trains of the captured object and standard pattern are hereinafter referenced as vectors.

Figure 1:
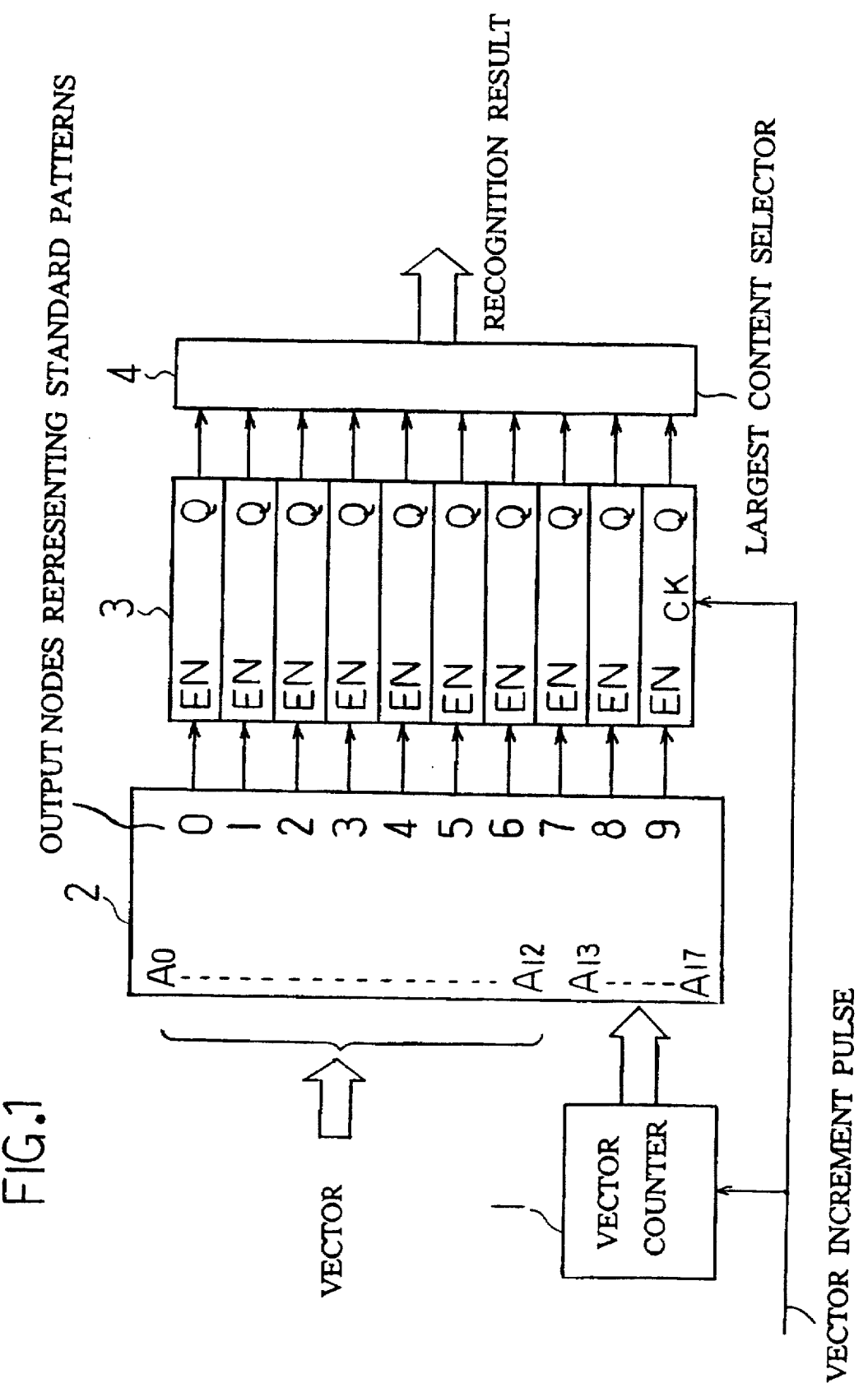
FIG. 1 is a block diagram of a pattern matching device as a preferred embodiment of the present invention.

FIG. 1 is a block diagram of pattern matching device to realize an embodiment of this invention. The process of pattern recognition undergoes capture of a recognition object, shading correction, decision of an area for the object, binarization and normalization to uniform size, followed by comparing the treated patterns with the similarly normalized reference patterns for recognition of the pattern of the object (character or figure) as the standard pattern matched. The pattern matching device distinguishes each pixel represented in the vector form through the treatments hereinabove described.

Figure 2:
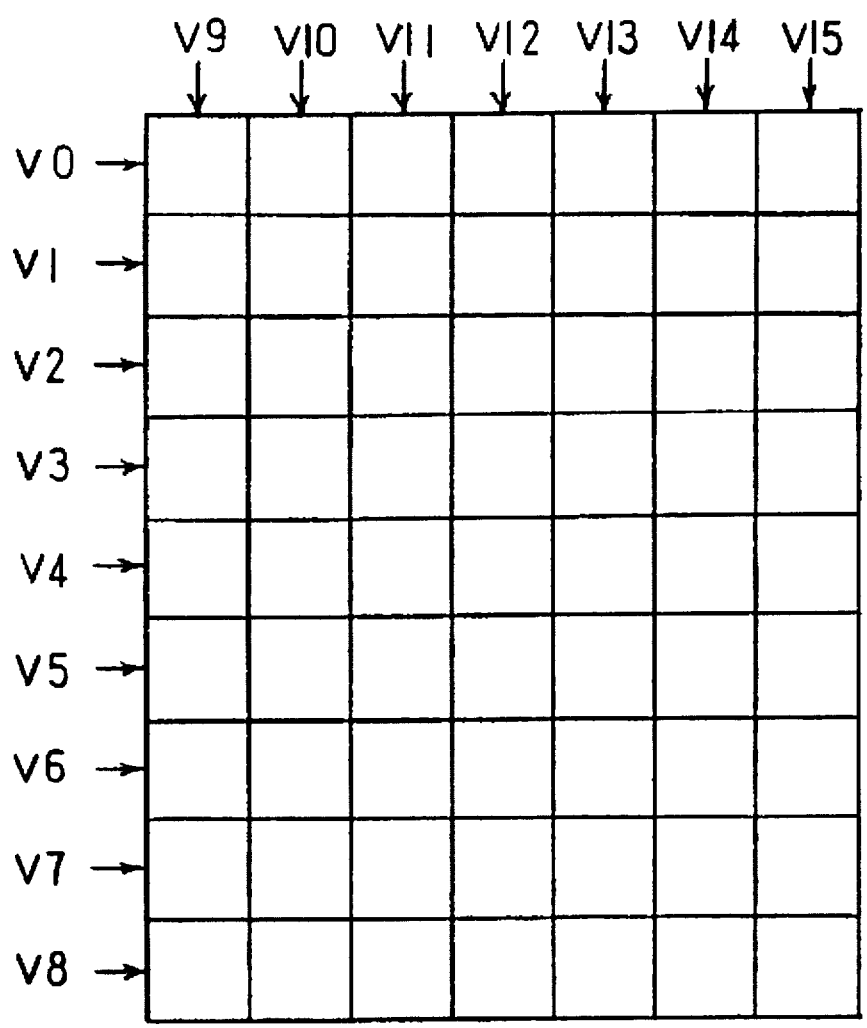
FIG. 2 illustrates an example of a procedure for selection of the vectors from a pixel matrix.

Definition of vectors and reference vectors needs to precede explanation of FIG. 1. FIG. 2 indicates the vectors for an image represented by a pixel matrix of 9 rows by 7 columns, each of which constitutes a vector. The vectors thus have different numbers of component pixels for some representation of images. The vectors are distinguished by numbering. In FIG. 2 the row vectors are numbered from v0 to v8 and the column vectors from v9 to v15. The vectors for matching are derived from pixels in the image with normalized size obtained by capture of the recognition object. The reference vectors are generated from the standard patterns (characters or figures), which are captured to yield the images in the prescribed size so that the vectors derived from the pixels in the image of one of the standard patterns and the vectors formed from the latter vectors by modification corresponding to partial fading and variance in strokes constitute the reference vectors for the standard pattern.

Figure 3:
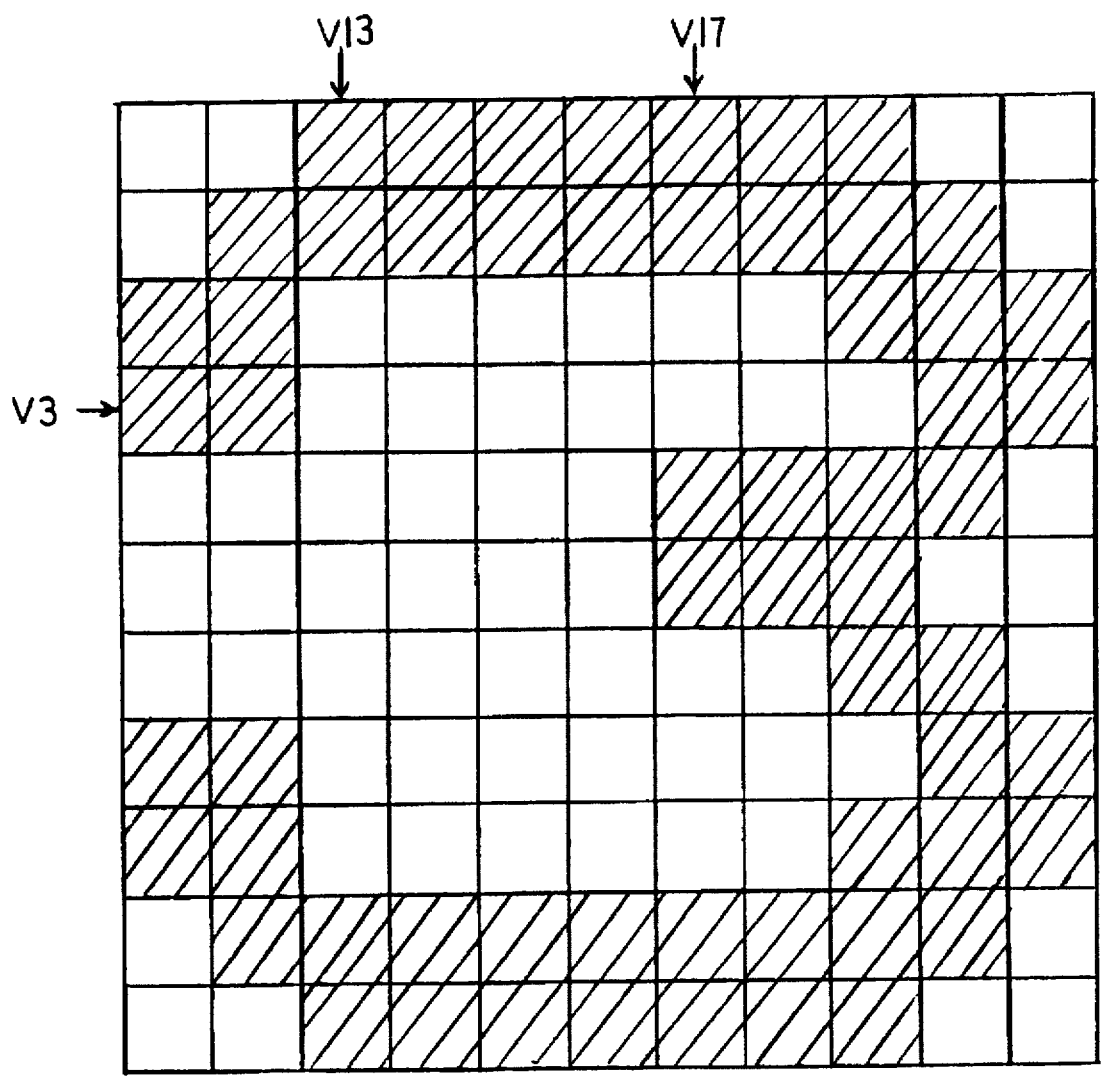
FIG. 3 displays a pixel matrix representing the numeral 3.

FIG. 3 shows a 11×11 pixel matrix representing an image of numeral 3. The constituents of the vectors v3, v17 and v13 are illustrated in FIGS. 4A, 4B and 4C, respectively, and referred to bit patterns, which strongly correlate to the numeral 3 represented in the image. When the image in FIG. 3 is captured from the standard pattern of numeral 3, the recognition object yields the same image as the standard pattern at the same capture condition. It is then easy to identify the recognition object with the standard pattern by matching the corresponding vectors (i.e., pairs of correspondingly numbered vectors) of the two images. For this case, the vectors modified for variance need not be included in the reference vectors. On the other hand, the recognition objects in general have partial fading and thin or thick stroke in character, and their capture conditions are different from those for the standard patterns, so that the vectors modified for these variances have to be added to the reference vectors.

The reference vectors are generated as follows. A standard pattern is captured at various conditions for several images, from each of which the vectors are derived, and intentionally deviated for variance such as partial fading to gain additional vectors as the reference vectors. A cluster of all of these vectors with the same number constitute the reference vectors for that same vector number.

The generation procedure for the reference vectors is described in detail herein below:

1-1) A standard character (for example, numeral 3) to be recognized is provided;

1-2) The image of the character captured by a TV camera is normalized with common treatments publicly known (such as shading correction, binarization, and size normalization) to construct an m×n pixel matrix;

1-3) The vectors are derived from this pixel matrix, numbered, and represented in bit pattern;

1-4) The capture condition for the TV camera is then varied with such changes as in the strength of illumination, slight rotation of the standard character, minute adjustment of focusing, and the threshold value for binarization. The image captured at a new condition is treated similarly with 1-2) and 1-3).

1-5) The process of 1-4) is repeated for as many variations as possible.

2-1) The bit pattern for every vector derived in 1-3) is deviated by the pattern modification procedure described hereinafter. The bit pattern is a sequence of bits "1" and "0" representing the character and the background, respectively (or the reverse assignment). A continuous series of "1" bits is called "Segment", which is modified for pattern deviation. Changes in the segments in a vector yield many deviated vectors.

2-2) The procedure of 2-1) is applied to all the vectors derived from the pixel matrices obtained in 1-5);

2-3) The reference vectors $G_{3i}$ for the vector $g_{3i}$ of standard character "3" are comprised of a cluster of vectors collected for vector $v_i$ among the vectors procured with 2-2).

3-1) For all the standard characters to be recognized (for example, numerals 0–9). The steps of 1-1)–1-5) and 2-1) –2-3) are performed to generate the reference vectors for every vector in the pixel matrix of each standard character.

The rules for systematic modification of the bit pattern in each vector derived with 1-3) are explained hereinbelow. As indicated in FIGS. 4A, 4B and 4C, the bit pattern is a sequence of "1" and "0" bits representing the character and the background, respectively, in which the bit "1" often appears consecutively. Clusters of the bit "1" like v3-1, v3-2, v17-1, v17-2 and v17-3 are called segments. Systematic modification of all the segments according to the rules leads to approximate representation of character deviations like partial fading and thick and thin strokes.

Figure 5:
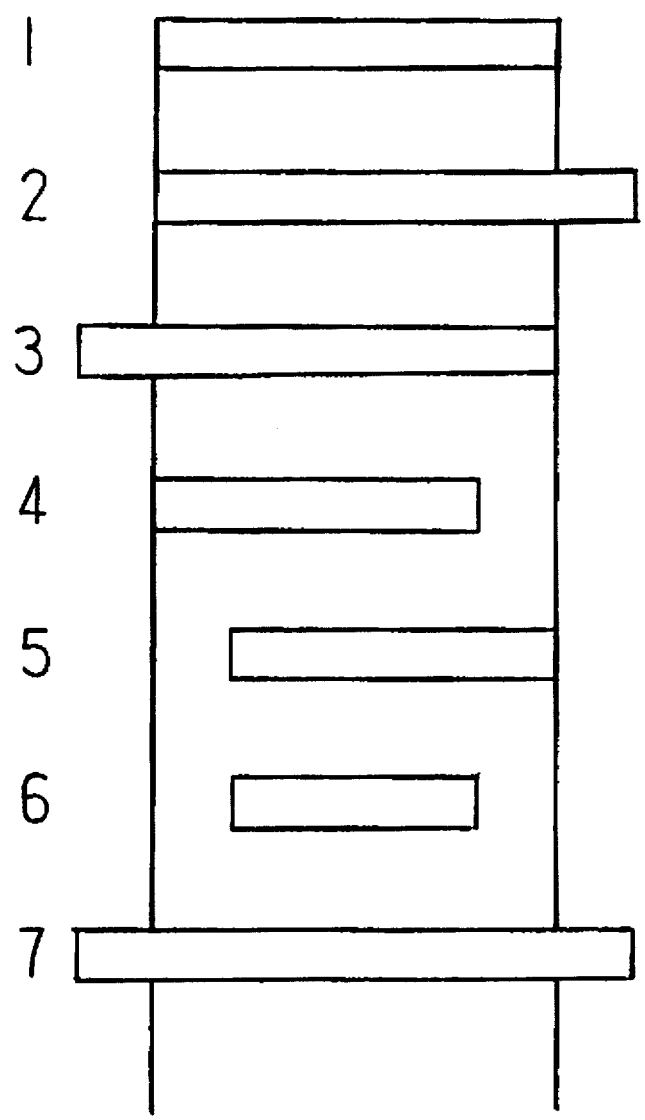
FIG. 5 illustrates the rules for modification of a segment in a vector for change in vector pattern.

An example for modification of a segment according to the rules is shown in FIG. 5. The segment 1 is the original segment, to which a pixel is added to the right and left ends to yield the segments 2 and 3, respectively. Deletion of pixel from the right and left ends of segment 1 results in the segments 4 and 5, respectively. Deletion and addition of a pixel at both the right and left ends of segment 1 generate the segments 6 and 7, respectively.

FIG. 6 demonstrates application of the rules in FIG. 5 to the vector v17 in FIG. 4B. The vectors 1–7 are generated by modification of the segments v17-2, the middle segment of three segments in vector v17. On the other hand, in application of the rules to the segment v17-1, which is located at the left end, a pixel cannot be added to the left end according to the rules 3 and 7, while for the segment v17-3 located at the right end addition of a pixel to the right end according to the rules 2 and 7 is unavailable.

In FIG. 1 the vector counter 1 counts the vector number for a recognition objected image. A clock increments the vector number. The look-up-table ROM 2 puts out the standard pattern represented by the input vector with the vector number indicated in the vector counter 1. For the case of FIG. 1 the standard patterns are to be ten characters of numerals 0–9. The address in the look-up table ROM 2 is assigned to the bit pattern of a vector and the memory area at this address stores the names of standard patterns having the same vector as the address in their reference vectors. Receiving a vector as the address, the look-up-table ROM 2 puts out the standard patterns corresponding to the input vector. A0–A12 on the left side of the look-up-table ROM 2 represent the respective digits of bit pattern of the vector, so that the bit pattern with the maximum length of 13 bits is acceptable. The digits A13–A17 indicate the vector number, which can be counted 0 through 31 in this case. The output nodes 0–9 on the right side correspond to the standard patterns 0–9, respectively, so that, for example, the nodes 3 and 8 deliver the matching signal when the input vector is found in the reference vectors of the standard patterns 3 and 8. The counter 3 is provided for each of the standard patterns, that is, the characters to be recognized. In the present case, the counter is connected respectively to the output nodes 0–9 of the look-up-table ROM 2 to count the matching synchronously with the clock every time when the output nodes 0–9 deliver the matching signal. The largest content selector 4 examines the score accumulated in each of the counter 3 to distinguish the standard pattern corresponding to the counter 3 with the maximum score as the character represented with all input vectors.

Figure 7:
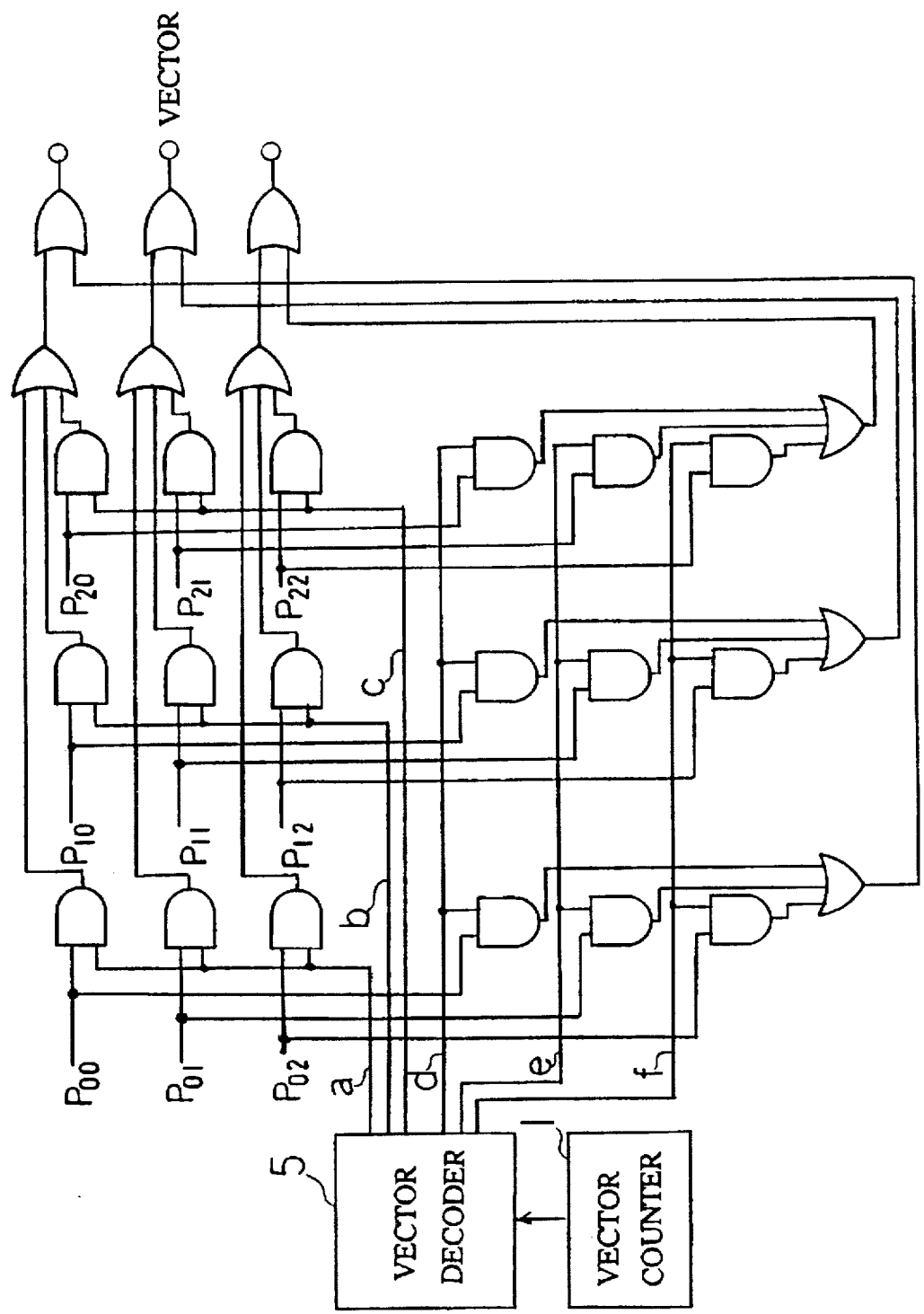
FIG. 7 is a diagram showing a circuit to transform a pixel matrix into the vectors.

An exemplary circuit for transformation of a pixel matrix into vectors is shown in FIG. 7, which is a diagram of a circuit to transform a 3×3 pixel matrix in FIG. 8 into row and column vectors. The transformation circuit is connected to the address A0–A12 in the look-up-table ROM 2 in FIG. 1 to provide the vector with the vector number indicated in the vector counter 1 in FIG. 1. A vector decoder 5 delivers the output signals for the vector corresponding to the vector number from the vector counter 1. For instance, input of vector number v0 causes the output "1" in the signal line d to supply the output ($P_{00}$, $P_{10}$, $P_{20}$) from the output nodes, while input of vector number v3 feeds the output "1" in the signal line a for the output ($P_{00}$, $P_{01}$, $P_{02}$) from the output nodes.

Figure 9:
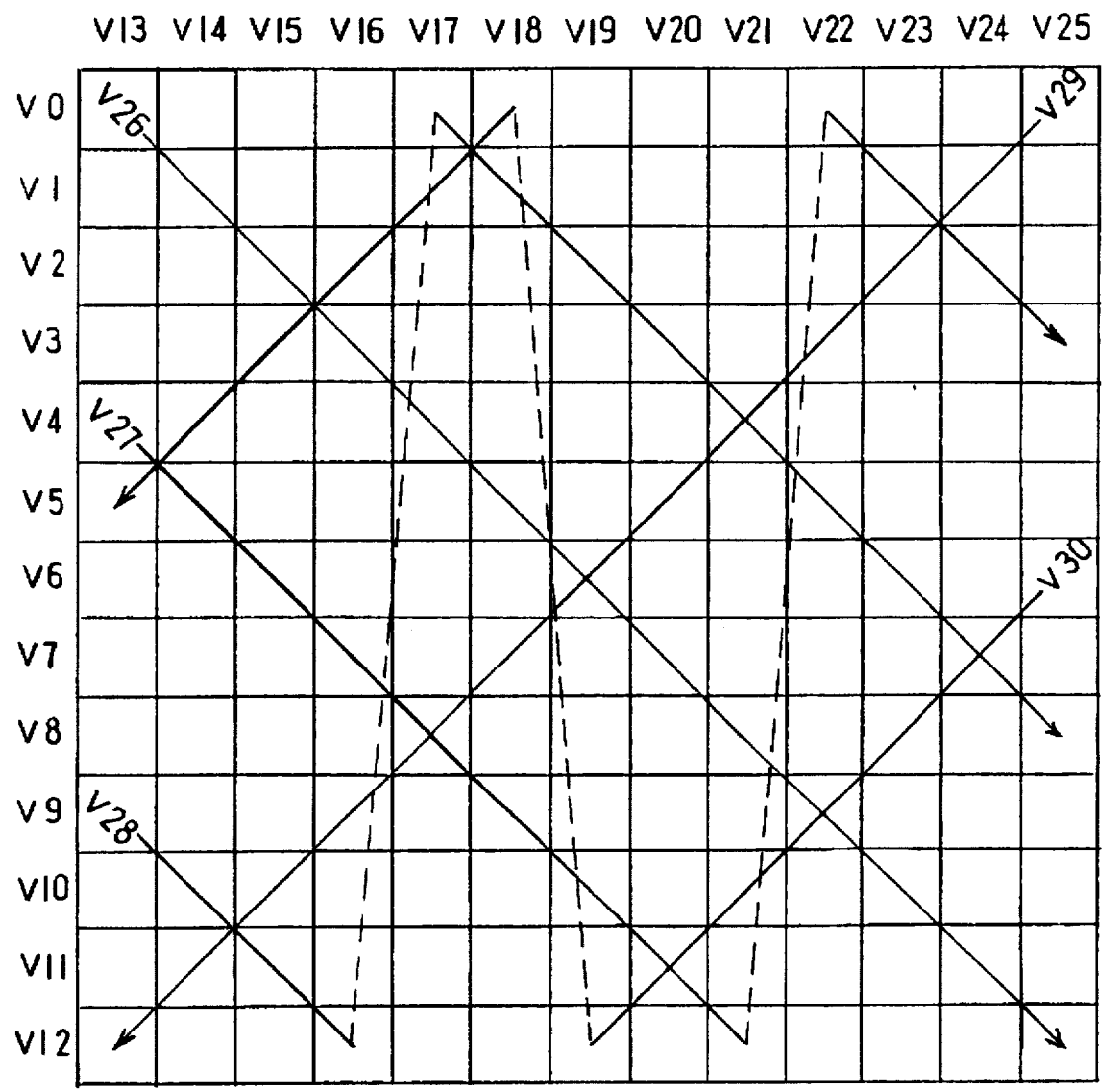
FIG. 9 demonstrates selection of the vectors including that in slanted directions.
Figure 10A:
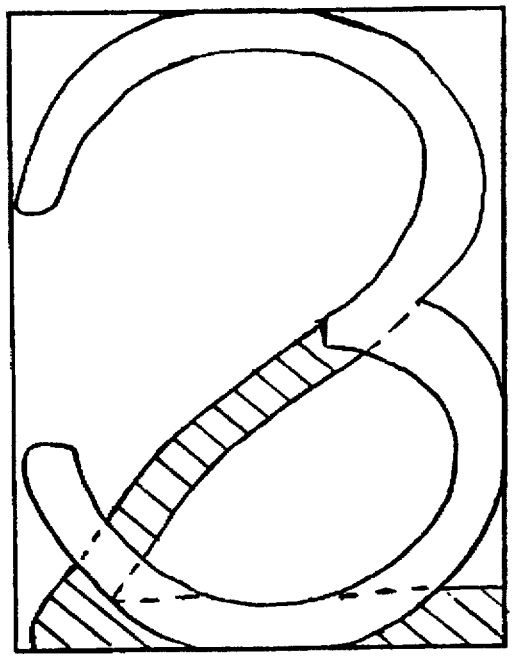
FIG. 10A illustrates an example of mismatching in recognition of a character.
Figure 10B:
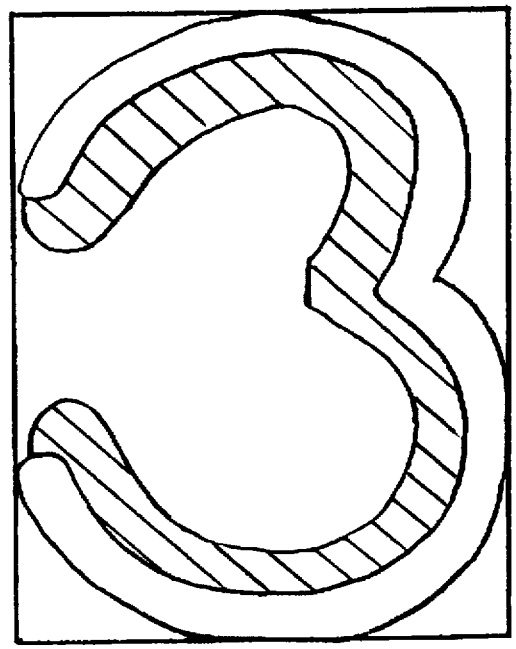
FIG. 10B displays another example of mismatching.

The process of pattern matching is now explained. The standard patterns are to be 10 characters of numerals 0–9. The image captured from a standard pattern constitutes a 13×13 pixel matrix. The image of the recognition object is similarly normalized to comprise pixels in the same size. FIG. 9 displays such a 13×13 pixel matrix, from which the vectors are derived as 13 row vectors and 13 column vectors supplemented with 5 vectors in slanted direction. The number of pixels in the slanted vectors is set to 13, equal to that of the row and column vectors. The slanted vector on the diagonal consists of a single sequence of pixels, while the others consist of two sequences of pixels. The vector number is assigned as v0~v30 to the three kinds of vectors in order beginning from the row vectors.

As the vector number for the recognition object is indicated sequentially by the vector counter 1, the corresponding vector from the transformation circuit shown in FIG. 7 is fed in the address of the look-up-table ROM 2. Output of the slanted vectors employs other specific transformation-circuit. The look-up-table ROM 2 puts out from the output nodes 0~9 the standard patterns having the reference vectors with the bit patterns matching that of the input vector. For instance, matching for the standard pattern "0" delivers the matching signal from the output node "0". In actual operation, the bit pattern of an input vector would often match that of the reference vector for more than a single standard pattern, so that the corresponding number of standard patterns is put out. In reference to FIG. 3 and FIGS. 4A, 4B and 4C, each of the vectors v3 and v17 represent both of the numerals 3 and 8. Inclusion of vector v13 increases the probability for numeral 3. Input of many vectors thus raises the recognition probability for the recognition-objected character. Accordingly, all the vectors derived for the recognition object are usually used for input. Solely with the vectors representing the feature parts of standard patterns, however, the recognition-objected character can be distinguished with good accuracy.

The counter 3 individually provided for each standard pattern counts every matching signal, and holds the accumulated score. This procedure is repeated from v0 to the final vector v30 and the counter 3 with the maximum score is identified. The standard pattern corresponding to the counter 3 selected by selector 4 is recognized as the character for the recognition object.

In the embodiment described hereinabove, the vectors chosen in the slanted direction (at an angle of 45° in this case) are included not only because more vectors lead to the higher recognition accuracy, but because the number of vectors possible in row and column directions is limited. Moreover, when the reference vector with the vector number same as an input vector and the bit pattern matching that of the input vector is found in the reference vectors, a count is added to the counter 3 for the corresponding standard pattern. On the other hand, a look-up-table ROM 2 can be designed to distinguish a vector never represents a particular standard pattern, so that reduction of the score in the counter 3 corresponding to that particular standard pattern in response to input of such a vector raises the recognition accuracy further. For instance, for input of vector v17 in FIG. 3, which never represents the numeral 1, the counter 3 for the standard pattern "1" is decremented by one.

For the cases hereinabove described the counter 3 is incremented or decremented by one, but operation by 1 or −1 is not necessarily exclusive for counting. For example, 2 or 3 counts may be added for a higher degree of matching as the segment 1 in FIG. 5. Furthermore, although all the row and column vectors and several slanted vectors are used for the foregoing examples, all the vectors are not required for recognition of a sample. The vectors need not have all components in a row or column, either, and may still have various numbers of components. Besides formation of a vector with matrix components in slant direction, the components of a vector may also comprise combinations of components in any row, column and slanted directions. As a matter of fact, the vector has only to represent the feature of a sample with any number and order of the constituent pixels.

As described hereinabove, this invention distinguishes the standard pattern representing a recognition object by evaluation of matching score of the vectors in the recognition object with the reference vectors with the same vector numbers, which are procured from the vectors in the standard patterns and the modified vectors representing the images deviated due to change in capture condition and/or partial fading of character. This method enables recognition of an object deviated from the standard pattern with better accuracy. Rather arbitrary derivation of the vectors also provides the vectors at feature parts of the pattern to raise the recognition accuracy. It thus follows that the pixels required for identification of the recognition object may be chosen in slant direction as well as the row and column directions in the pixel matrix to constitute the vectors, the pattern recognition becoming possible with less data and less errors.

Although obvious changes may be made in the specific embodiment of the invention described herein, such modifications are within the spirit and scope of the invention claimed, indicating that all matter contained herein is intended as illustrative and not as limiting in the scope.

What is claimed is:

1. A method for matching a pattern with one of a plurality of standard samples comprising the steps of:

representing a recognition image captured from a recognition-objected sample by an m×n matrix of binary pixels forming a binary image, where each of m and n is an integer;

forming a plurality of M pixel trains $v_i$ by choosing, from said m×n matrix of binary pixels, a consecutive sequence of binary pixels according to prescribed rules for each pixel train $v_i$, where i is an index having integer values in a range between 1 and a predetermined integer M;

choosing a predetermined subset of said pixel trains $v_i$ of said binary pixels;

matching each of said chosen subset of pixel trains $v_i$ to reference pixel trains $G_{ki}$ respectively corresponding thereto for each of a plurality of N standard samples, where k is an index having integer values between 1 and a predetermined integer N;

wherein said reference pixel trains $G_{ki}$ are formed by obtaining a cluster of pixel trains $g_{ki}$ from N m×n pixel matrices each representing a respective standard image for a standard sample k, and by generating multiplex pixel trains $g_{ki}$, by performing a predetermined systematic modification of pixels in said pixel trains $g_{ki}$ to form, together with said pixel trains $g_{ki}$, said reference pixel trains $G_{ki}$;

maintaining a score for each standard sample k of said N standard samples in accordance with a number of matches between said reference pixel trains $G_{ki}$ thereof and the corresponding chosen subset of pixel trains $v_i$, and identifying a particular one of said N standard samples as matching said recognition-objected sample when said particular standard sample has a maximum score of said scores maintained for said standard samples.

2. A method in accordance with claim 1, wherein said step of maintaining a score comprises adding a predetermined amount to the score of any standard sample k of said N standard samples when a particular pixel train $G_{ki}$ thereof matches a corresponding one of said chosen subset of pixel trains $v_i$.

3. A method in accordance with claim 2 wherein, for a certain number of pixel trains in said subset of pixel trains, said step of choosing a consecutive sequence of binary pixels comprises choosing consecutive sequences of said pixels according to said prescribed rules from m rows in said m×n matrix of binary pixels representing said recognition image.

4. A method in accordance with claim 2 wherein, for a certain number of pixel trains in said subset of pixel trains, said step of choosing a consecutive sequence of binary pixels comprises choosing consecutive sequences of said pixels according to said prescribed rules from n columns in said m×n matrix of binary pixels representing said recognition image.

5. A method in accordance with claim 2 wherein, for a certain number of pixel trains in said subset of pixel trains, said step of choosing a consecutive sequence of binary pixels comprises choosing according to said prescribed rules a series of pixels in a line at an angle of 45° in said m×n matrix of binary pixels representing said recognition image.

6. A method in accordance with claim 2 wherein, for a certain number of pixel trains in said subset of pixel trains, said step of choosing a consecutive sequence of binary pixels comprises choosing according to said prescribed rules a series of pixels, in arbitrary position, number, and order, from feature parts of said recognition-objected sample in said m×n matrix of binary pixels representing said recognition image.

7. A method in accordance with claim 2 wherein, for a certain number of pixel trains in said subset of pixel trains, said step of choosing a consecutive sequence of binary pixels comprises choosing according to said prescribed rules, a combination of at least two groups of pixels, in rows chosen from m rows in said m×n matrix of binary pixels representing said recognition image and in columns chosen from n columns in said m×n matrix of binary pixels representing said recognition image, choosing a series of pixels in a line at an angle of 45° in said m×n matrix of binary pixels representing said recognition image, and choosing a series of pixels in arbitrary position, number, and order from feature parts of said recognition-objected sample in said m×n matrix of binary pixels representing said recognition image.

8. A method in accordance with claim 2, comprising the step of providing a plurality of standard images including original images for each of said standard samples under a predetermined capture condition and additional images for each of said standard samples under various capture conditions differing from said predetermined capture condition, and the step of forming said reference pixel trains for each of the plurality of standard images.

9. A method in accordance with claim 2, comprising the step of providing said predetermined systematic modification of constituent pixels in said pixel trains by changing a number of pixels in a segment of a pixel train which includes a continuous series of pixels of a single binary value.

10. A method in accordance with claim 1, wherein said step of obtaining a cluster of pixel trains $g_{ki}$ of said reference pixel trains $G_{ki}$ from said N pixel matrices representing said standard images comprises choosing consecutive sequences of binary pixels from said N pixel matrices according to said prescribed rules used for forming the respectively corresponding pixel trains $v_i$ from said matrix representing said recognition image.

11. A method for matching a pattern with one of a plurality of standard samples comprising the steps of:

representing a recognition image captured from a recognition-objected sample by an m×n matrix of binary pixels forming a binary image, where each of m and n is an integer;

forming a plurality of M pixel trains $v_i$ by choosing, from said m×n matrix of binary pixels, a consecutive sequence of binary pixels according to prescribed rules for each pixel train $v_i$, where i is an index having integer values in a range between 1 and a predetermined integer M;

choosing a predetermined subset of said pixel trains $v_i$ of said binary pixels;

matching each of said chosen subset of pixel trains $v_i$ to reference pixel trains $G_{ki}$ respectively corresponding thereto for each of a plurality of N standard samples, where k is an index having integer values between 1 and a predetermined integer N;

wherein said reference pixel trains $G_{ki}$ are formed by obtaining a cluster of pixel trains $g_{ki}$ from N m×n pixel matrices each representing a respective standard image for a standard sample k, and by generating multiplex pixel trains $g_{ki}'$ by performing a predetermined systematic modification of pixels in said pixel trains $g_{ki}$ to form, together with said pixel trains $g_{ki}$, said reference pixel trains $G_{ki}$;

maintaining a score for each standard sample k of said N standard samples in accordance with a number of matches between said reference pixel trains $G_{ki}$ thereof and the corresponding chosen subset of pixel trains $v_i$, by:

i) adding a predetermined amount to the score of any standard sample k of said N standard samples when a particular pixel train $G_{ki}$ thereof matches a corresponding one of said chosen subset of pixel trains $v_i$, and ii) subtracting a predetermined amount from the score of any standard sample k of said N standard samples when a particular pixel train $G_{ki}$ thereof never matches a corresponding one of said chosen subset of pixel trains $v_i$, and identifying a particular one of said N standard sample as matching and representing said recognition-objected sample when said particular standard sample has a maximum score of said scores maintained for said standard samples.

12. In a method for matching a recognition object with one of a plurality of N standard patterns where N is an integer, implemented on an apparatus including means for capturing the recognition object, binarizing and normalizing the recognition object and forming a matrix of binary pixels representing a binary image of the recognition object, improvement comprising:

generating input signals corresponding to a plurality of input pixel trains $v_i$, said input signals for each input pixel train representing a respective consecutive sequence of binary pixels selected in accordance with prescribed rules from said matrix, where i is an index having integer values greater than 1, producing reference signals corresponding to reference pixel trains $G_{ki}$ of a kth one of said plurality of standard patterns, where k is an integer between 1 and N, said reference pixel trains representing sequences of binary pixels from matrices representing binary images of the standard patterns respectively corresponding to said sequences of binary pixels selected from said matrix representing the recognition object, by:

a) obtaining first signals corresponding to a cluster of pixel trains $g_{ki}$ from said N pixel matrices each representing a respective standard image for a standard sample k, and b) obtaining second signals corresponding to multiplex pixel trains $g_{ki}'$ by performing a predetermined systematic modification of said first signals for pixels to form, together with said first signals, said reference signals corresponding to said reference pixel trains $G_{ki}$;

generating output signals representing matches between said input signals, corresponding to said input pixel trains $v_i$ of the recognition object, and reference signals corresponding to reference pixel trains $G_{ki}$ maintaining a score for each of said plurality of N standard patterns in accordance with a number of matches occurring between said input pixel trains $v_i$ and said reference pixel trains $G_{ki}$ thereof, and providing an output signal identifying a particular one of said standard patterns as matching said recognition object when said particular standard sample has a maximum score of said scores maintained for said N standard patterns.

13. In an apparatus for matching a recognition object with one of a plurality of N standard patterns including means for capturing the recognition object, where N is an integer, and for binarizing and normalizing the recognition object and forming an m×n matrix of binary pixels representing a binary image of the recognition object, the improvement comprising:

a first circuit having an input for receiving input signals representing a plurality of input pixel trains $v_i$, each input pixel train representing a respective consecutive sequence of binary pixels selected in accordance with prescribed rules from said m×n matrix, where i is an index having integer values greater than 1, said first circuit having an output for outputting signals representing matches between each input pixel train $v_i$ of the recognition object, representing a sequence of pixels from said m×n matrix, and corresponding reference pixel trains $G_{ki}$ of a kth one of said plurality of standard patterns, representing respectively corresponding sequences of binary pixels from matrices representing binary images of the standard patterns, where k is an integer between 1 and N, wherein said reference pixel trains $G_{ki}$ comprise:

a) a cluster of first pixel trains $g_{ki}$, from N m×n matrices each representing a respective kth binary image, for a kth standard pattern, and b) multiplex pixel trains $g_{ki}'$, generated by predetermined systematic modification of constituent pixels in said first pixel trains $g_{ki}$, a second circuit for maintaining a score for each of said plurality of N standard patterns in accordance with a number of matches between said input pixel trains $v_i$ and said reference pixel trains $G_{ki}$ thereof, and a selector for identifying a particular one of said standard patterns as matching and representing said recognition object when said particular standard sample has a maximum score of said scores maintained for said N standard patterns.

14. An apparatus in accordance with claim 13, wherein said second circuit for maintaining a score comprises means for adding a predetermined amount to the score of a kth standard pattern when a particular pixel train $G_{ki}$ thereof matches a respectively corresponding one of said input pixel trains $v_i$.

15. An apparatus in accordance with claim 14, wherein said second circuit for maintaining a score further comprises means for subtracting a predetermined amount from the score of a kth standard pattern when a particular pixel train $G_{ki}$ thereof never matches a respectively corresponding one of said input pixel trains $v_i$.

16. An apparatus in accordance with claim 13, wherein said second circuit for maintaining a score comprises a plurality of N adders corresponding to said N standard patterns, each adder maintaining a kth score, for a kth standard pattern, by incrementing the kth score in response to a match between a particular pixel train $G_{ki}$ of said kth standard pattern and a respectively corresponding one of said input pixel trains $v_i$.

17. An apparatus in accordance with claim 13, wherein said first circuit comprises a memory having a plurality of storage locations, each storage location identified by an address, wherein said input receives a multi-bit input pixel train $v_i$ as an address, and wherein a storage location of said memory identified by an address $v_i$ stores identifications of any values of k identifying matching standard patterns which include a reference pixel train $G_{ki}$ which matches said input pixel train $v_i$, said output of said memory outputting signals representing said values of k for said matching standard patterns.

18. An apparatus in accordance with claim 13, further comprising a logic circuit for generating said pixel trains $v_i$ from said binary pixels of said m×n matrix, including:

a) pixel train decoding means for receiving as an input a pixel train identification number i and for providing an output signal on one of a plurality of output lines;

b) a plurality of first gates, each of said first gates connected for receiving an input value representing a particular binary pixel from a particular position in said m×n matrix, c) a plurality of second gates receiving outputs from said first gates for outputting a pixel train $v_i$ for said m×n matrix in response to input of said pixel train identification number i to said pixel train decoding means;

wherein each of said output lines from said pixel train decoding means is connected for enabling a set of said first gates selected in accordance with said prescribed rules to transmit respective input values of binary pixels inputted thereto to said second gates.

19. An apparatus in accordance with claim 18, further comprising a pixel train counter for generating a sequence of pixel train identification numbers in response to a clock signal, wherein said pixel train decoding means and said first circuit are each connected for receiving said pixel train identification numbers from said pixel train counter, thereby to provide said input pixel train $v_i$ and said pixel train identification number i to said first circuit substantially simultaneously.

20. An apparatus in accordance with claim 19, wherein said second circuit and said pixel train counter are each connected to be clocked by said clock signal, thereby synchronizing said second circuit with said signal representing matches outputted from said first circuit.

21. An apparatus in accordance with claim 20, wherein said first circuit comprises a memory having a plurality of storage locations, each storage location identified by an address, wherein said input receives a multi-bit input pixel train $v_i$ as an address, and wherein a storage location of said memory identified by an address $v_i$ stores identifications of any values of k identifying matching standard patterns which include a reference pixel train $G_{ki}$ which matches said input pixel train $v_i$, said output of said memory outputting signals representing said values of k for said matching standard patterns, and said second circuit comprises a plurality of N adders corresponding to said N standard patterns, each adder maintaining a kth score, for a kth standard pattern, by incrementing the kth score in response to an output from said a match between a particular pixel train $G_{ki}$ of said kth standard pattern and a respectively corresponding one of said input pixel trains $v_i$.

* * * * *